July 15, 1952
T. C. LLOYD
2,603,161
WET ARMATURE MOTOR AND PUMP COMBINATION WITH SHAFT BEARINGS
Filed Dec. 31, 1949
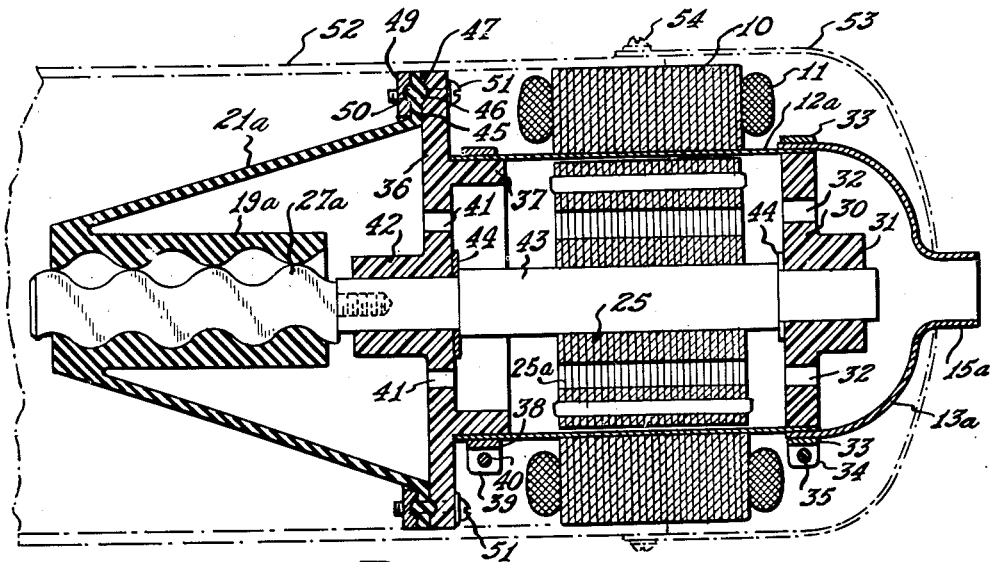
FIG. 3.
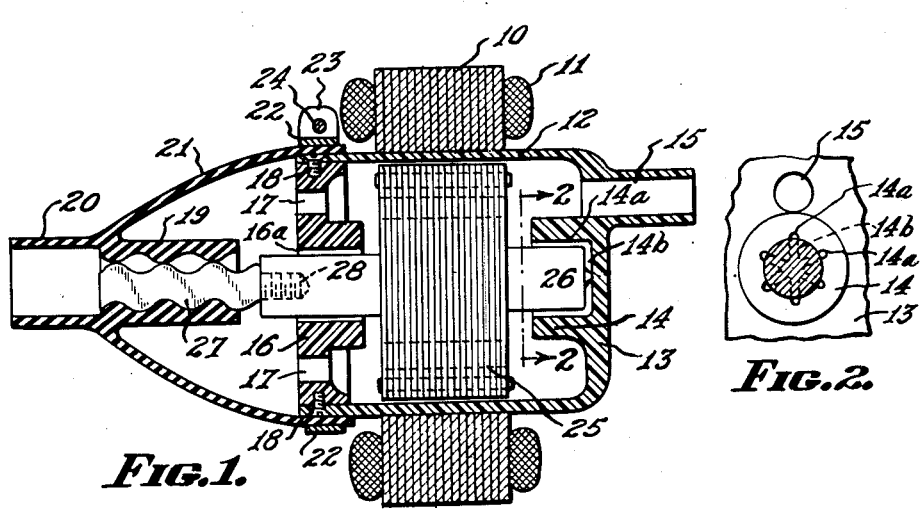
FIG. 1.
FIG. 2.
INVENTOR.
TOM C. LLOYD,
BY Allen & Allen
ATTORNEYS.

Patented July 15, 1952

2,603,161

UNITED STATES PATENT OFFICE 2,603,161

WET ARMATURE MOTOR AND PUMP COMBINATION WITH SHAFT BEARINGS

Tom C. Lloyd, Springfield, Ohio, assignor to Robbins & Myers, Inc., Springfield, Ohio, a corporation of Ohio Application December 31, 1949, Serial No. 136,189

7 Claims. (Cl. 103—118)

This invention relates to a wet armature motor and pump combination having shaft bearings. More specifically, it relates to a combination including an electric motor having secured to the armature thereof a pump rotor and a stator adapted to cooperate with the pump rotor which stator is provided with a casing element wherein the armature of the motor actually operates within the pump casing and is isolated from the field coils of the motor so that the fluid being pumped passes through and about the armature and lubricates the armature bearings.

Reference is made to a co-pending application, Serial No. 136,190, filed December 31, 1949, wherein I have disclosed a wet armature motor and pump combination wherein no shaft bearings are provided for the motor armature. Inasmuch as cases will be found where shaft bearings are considered desirable or necessary, I have disclosed herein several embodiments of a combination wherein shaft bearings are provided.

While the present invention is applicable to combinations of motors with pumps of various kinds I have illustrated it particularly in connection with a pump of the type disclosed by R. J. L. Moineau in his Patent No. 1,892,217, issued December 27, 1932. This pump has a rotor having an external helical thread of rounded contour and a stator having an internal helical thread of rounded contour, but the stator has one thread more than the rotor. I have also taken advantage of certain improvements in pumps disclosed in a co-pending application of Byram and Zimmer, Serial No. 159,079, filed April 29, 1950.

It will be understood that the particular pump, together with its particular improvements, has been used by way of example and that the general principles of the present invention apply with equal force to pumps of various types.

According to the said co-pending application of Byram and Zimmer the stator member of the pump is provided with a port extension substantially coaxial with the stator and with a funnel-like casing member surrounding the stator portion, the stator portion, port portion and funnel-like portion being preferably integrally molded from a single piece of resilient material.

It is an object of the present invention to provide a motor and pump combination of low cost, and of very compact construction. It is another object of the present invention to provide such a combination wherein the motor, although it requires bearings, may be provided without any seals because of the fact that the liquid being pumped circulates through and about the rotating armature and through and about the shaft bearings and lubricates said bearings.

These and other objects of the invention which will be pointed out in greater detail as the description proceeds or which will suggest themselves to those skilled in the art upon reading these specifications, I accomplish by that certain construction and arrangement of parts of which I shall now describe certain exemplary embodiments.

Reference is made to the drawings forming a part hereof and in which:

Figure 1 is a central cross sectional view through a motor-pump combination according to the invention.

Figure 2 is a fragmentary cross sectional view of the same taken on the line 2—2 of Figure 1, and Figure 3 is a central cross sectional view of a modified construction.

Briefly, in the practice of my invention, as in my copending application above referred to, I isolate the armature of the motor from the field coils and core thereof by means of a water-proof sheath. I provide a port at one end of the sheath, and at the other end I provide a casing portion having on its inside a pump stator. The motor armature shaft carries a pump rotor in operative relation to said stator so that the liquid being pumped passes entirely through the motor armature and through and about the bearings provided therein for the motor shaft and lubricates the same in its passage. While in my said co-pending application I disclosed a construction wherein motor bearings were eliminated in that the motor armature had its bearing on the inside of the isolating sheath, I have in the present application disclosed an arrangement wherein motor shaft bearings are provided, and these bearings are lubricated by the flow of the liquid being pumped by the pump. In the present device, as in the device of my co-pending application, the motor armature is operating, as it were, within the pump casing, and thus seals of all sorts are entirely eliminated.

In the particular embodiments disclosed herein I utilize the teachings of the above mentioned co-pending application of Byram and Zimmer. In the last mentioned copending application there is disclosed a pump stator element having a funnel-like casing member molded integrally therewith, and according to the present invention I secure the said funnel-like casing member so as to form in effect a continuation of the isolating sheath. By the present invention I achieve all the useful advantages of my said copending application, while providing shaft bearings for the motor armature shaft.

Referring now in greater detail to the drawings, the motor field core is indicated at 10 and is provided with the usual field coil 11. Within the core 10 there is provided a sheath 12 of waterproof material such as a plastic or even sheet metal. In the embodiment of Figure 1 the sheath 12 is shown as being made of suitable plastic material having integrally molded therewith a casing end portion 13 provided with a bearing boss 14 and a port fitting 15. The bearing boss 14 is provided with lubricating grooves 14a and 14b, as best seen in Figure 2.

In the open end of the sheath 12 I provide a spider member 16 which provides a second shaft bearing and which is provided with the usual lubricant grooves 16a. The spider member 16 is perforated as at 17 for the passage of the liquid being pumped and is secured within the sheath member 12 as by means of the screws 18.

The stator member according to the above mentioned Byram and Zimmer application comprises the stator portion proper 19 with which is integrally molded a port extension 20 substantially coaxial therewith and a funnel-like casing portion 21. I secure the open edge of the portion 21 about the end of the sheath 12 having the spider 16 as by means of a clamping ring 22 having suitable upstanding lugs 23 which are clamped together by means of a suitable screw 24. It will thus be seen that the portions 12, 13 and 21 form a complete casing within the field core and coils of the motor open only by means of the port fittings 15 and 20.

Within the sheath 12 the motor armature which is indicated at 25 is mounted upon a shaft 26 and has secured to it a pump rotor 27. The pump rotor may be threaded into one end of the shaft 26 as at 28.

When the pump and motor combination is in operation liquid is pumped through the port fitting 15, through and about the volume within the sheath 12 (whereby the shaft bearings in the boss 14 and the spider 16 are lubricated) and through the stator portion 19 and out through the port fitting 20.

The embodiment of Figure 3 does not differ at all in principle from the embodiment of Figures 1 and 2 but it does vary in certain minor respects. For example, the sheath which here is indicated at 12a is shown as being of sheet metal. In the embodiment of Figure 3 also the end cap 13a is separate from the sheath and is provided with a port fitting 15a. Since the end cap does not have an integral bearing boss as in the embodiment of Figure 1, I provide a spider member 30 having a bearing boss 31. The spider 30 is perforated at 32 to permit the passage of fluid being pumped, and the sheath 12a, spider 30 and the end cap 13a are held in assembled relation by a clamping ring 33 with suitable ears 34 and screw 35.

In the embodiment of Figure 3 I have shown a further modification at the pump end of the combination wherein the spider member differs somewhat in configuration from that shown in Figure 1. Here the spider member 36 is larger in diameter than the sheath 12a and has an annular flange 37 arranged to fit within the sheath 12a where it is clamped in position by a clamping ring 38 having ears 39 and screw 40. The spider 36 is again perforated as at 41 for the passage of the liquid being pumped and is provided with a bearing boss 42 for the other end of the motor shaft. In this particular embodiment I have shown the motor shaft 43 as having shoulders with washers 44 between the shoulders and the spiders 30 and 36. It will be clear that axial thrusts may be taken up in other ways as found suitable.

In this embodiment the funnel-like portion 21a of the pump stator is provided with an annular flange 45 which may be provided with a bead at 46. The periphery of the spider 36 may be provided with a suitable indentation 47 to engage the bead 46 and in this instance a clamping ring 49 is employed having an indentation 50 to engage the bead 46. The edge of the spider 36 and the flange 45 and the ring 49 are all assembled together by means of suitable screws 51. As before, the pump stator portion 19a is disposed within the funnel-like portion 21a, and the pump rotor 27a secured to the motor shaft 43 is in operative relation to the pump stator.

The embodiment of Figure 3 also illustrates how the entire motor-pump combination may be enclosed within a casing to give a more streamlined appearance thereto. Thus, I have shown a cylindrical casing member in broken lines at 52 and an end cap casing member at 53. The member 53 will have a central perforation for the passage of the port connection 15a and may be secured to the portion 52 by means of screws 54 or in any other suitable manner. The motor armature 25 will either be of the squirrel cage type and will be provided with suitable perforations 25a for the passage of liquids being pumped.

In the foregoing description and in the drawings I have disclosed several minor modifications to give an idea of the versatility of the invention. It will be understood of course that both embodiments embody the same fundamental principles and that numerous other modifications may be made without departing from the spirit of the invention. I therefore do not intended to limit myself in any manner except as set forth specifically in the claims which follow.

Having now fully described my invention, what I claim as new and desire to secure by Letters Patent is:

1. In combination, an electric motor having field coils and an armature, said field coils being separated from said armature by a liquid-tight sheath, spider means at each end of said sheath providing bearings, a shaft for said armature mounted in said bearings with said armature between said spider means, a pump rotor secured to said armature shaft, means outside said spider means for closing both ends of said sheath, an inlet port in one of said closing means, an outlet port in the other of said closing means, one of said closing means being funnel shaped and of flexible material and a pump stator disposed within said funnel shaped closing means and in operative relation to said pump rotor, whereby the liquid being pumped by said combination flows through and about said armature and lubricates said armature shaft bearings.

2. In combination, an electric motor having field coils and an armature, said field coils being separated from said armature by a liquid-tight sheath, spider means at both ends of said sheath providing bearings, a shaft for said armature mounted in said bearings with said armature between said spider means, a helical pump rotor secured coaxially to said shaft, means outside said spider means for closing both ends of said sheath, an inlet port in one of said closing means, an outlet port in the other of said closing means, one of said closing means being funnel shaped and of flexible material, and a pump stator disposed within said funnel shaped closing means, whereby the liquid being pumped by said combination flows through and about said armature and lubricates said armature shaft bearings.

3. The combination of claim 2, in which said funnel shaped closing means is integral with said pump stator.

4. The combination of claim 2, in which said entire funnel shaped closing means is molded of a single piece of resilient material.

5. The combination of claim 2, in which one of said closing means is integral with said sheath.

6. The combination of claim 2, in which means are provided for bearing the end thrust on said armature.

7. The combination of claim 2, in which said sheath and the other one of said closing means are integral.

TOM C. LLOYD.

REFERENCES CITED

The following references are of record in the file of this patent:

UNITED STATES PATENTS

| Number | Name | Date |
| --- | --- | --- |
| 1,780,337 | Canton | Nov. 4, 1930 |
| 1,780,338 | Canton | Nov. 4, 1930 |
| 1,780,339 | Canton | Nov. 4, 1930 |
| 1,849,222 | Canton | Mar. 15, 1932 |
| 1,881,344 | Apple | Oct. 4, 1932 |
| 1,892,217 | Moineau | Dec. 27, 1932 |
| 1,911,128 | Apple | May 23, 1933 |
| 1,983,262 | Zorzi | Dec. 4, 1934 |
| 2,161,374 | Moineau | June 6, 1939 |
| 2,212,417 | George | Aug. 20, 1940 |
| 2,317,517 | Brace | Apr. 27, 1943 |
| 2,317,520 | Coons | Apr. 27, 1943 |
| 2,450,963 | Hoover | Oct. 12, 1948 |